(12) United States Patent
Wakiyama et al.

(10) Patent No.: US 6,259,093 B1
(45) Date of Patent: Jul. 10, 2001

(54) SURFACE ANALYZING APPARATUS

(75) Inventors: Shigeru Wakiyama, Chiba; Naohiko Fujino, Tokyo, both of (JP)

(73) Assignees: Seiko Instruments Inc.; Mitsubishi Denki Kabushiki Kaisha, both of (JP)

( * ) Notice: Subject to any disclaimer, the term of this patent is extended or adjusted under 35 U.S.C. 154(b) by 0 days.

(21) Appl. No.: 09/201,182

(22) Filed: Nov. 30, 1998

(30) Foreign Application Priority Data

Dec. 1, 1997 (JP) .................................... 9-330064

(51) Int. Cl.⁷ ..................................................... H01J 37/00
(52) U.S. Cl. ........................................... 250/306; 356/237
(58) Field of Search ................................... 250/306, 307; 356/237

(56) References Cited

U.S. PATENT DOCUMENTS 5,517,027 * 5/1996 Nakagawa et al. .................. 250/306

* cited by examiner

Primary Examiner—Kiet T. Nguyen
(74) Attorney, Agent, or Firm—Adams & Wilks

(57) ABSTRACT

A system capable of detecting the presence and location of foreign matter on a sample includes a beam light applying system for projecting a beam of light onto a sample surface, an optical microscope for receiving light reflected from the sample surface in response to application of the beam light and for confirming the existence and location of foreign matter on the sample surface by observing scattering of the applied beam light by the foreign matter, and a polarizing element for polarizing light in such a manner that light scattered by a regular pattern on the sample is reduced by the polarization and light scattered by foreign matter on the sample is not reduced by the polarization. The system may be combined with a probe microscope for detecting a characteristic of the sample by monitoring an affect on a probe caused by the sample surface.

17 Claims, 3 Drawing Sheets

SURFACE ANALYZING APPARATUS

BACKGROUND OF THE INVENTION

The present invention relates to a system which a function of specifying the position of microscopic foreign-matter and a defect on a sample surface is added to a probe microscope such as an interatomic force microscope or a magnetic force microscope.

The interatomic force microscope, which is one kind of probe microscope has been expected to be a novel means for observing surface geometries of insulating substances and studies thereon have been advanced since it was invented by G. Binning, et al. who are also the inventors of STM (*Physical Review Letters*, vol. 56, p930, 1986). In its principle, an interatomic force acting between a detecting tip having a fully sharpened front end and a sample is measured as displacement of a spring element to which the detecting tip is attached and the sample surface is scanned while keeping the displacement of the spring element constant, and a control signal for maintaining the displacement of the spring element is used as geometric information, thereby measuring a geometry of the sample surface.

As to the displacement detecting means having a spring means, it is roughly divided into an STM system using tunnel current and an optical system. The STM system uses the so-called tunnel phenomenon wherein electric current begins to flow when voltage is applied to two conductors placed close to each other at a distance of several nano-meters to several angstroms. With the spring element previously given a conductivity a sharpened metal needle is approached to the spring element and brought to approximately 1 nano-meter from the sample until a tunnel current is made to flow, thereby performing a control with its current value being made a displacement signal of the spring element.

As to the optical system, there are reported an example in which so-called interference method is used (*Journal of Vacuum Science Technology* A6(2), p.266, Mar/Apr 1988) and an example called an optical-lever system in which a laser light is applied to a spring element and a positional deviation of its reflected light is detected by an optical detecting element, thereby making it a displacement signal (*Journal of Applied Physics* 65(1), 1, p.164, January 1989).

The probe microscope is called an interatomic force microscope if it is one in which a probe placed at a position facing a sample is subjected to interatomic force, and it is called a magnetic force microscope if it is one in which the probe is subjected to magnetic force and, in this manner, it can observe state of the sample by detecting various forces occurring from the sample.

The probe microscope is provided with a detecting section having so high a sensitivity that it can distinguish differences in interatomic geometry and the like. Therefore, it is deemed to be an effective instrument for easily obtaining sub-micron geometric observation, particularly geometric information in depth direction (Z-axis direction).

In the semiconductor field, it has been used for observing wafer surfaces with the miniaturization of devices. As a wafer surface observation, while there is observation of surface roughness, there is a necessity of observing the geometry of foreign-matter on the wafer, which is finer than that existing hitherto. In particularly, with a SEM (scanning electron microscope) there is difficulty in distinguishing crystal defects on a wafer due to difficulty in obtaining high contract because the sample surface and the crystal defect are formed of the same ingredient (silicon). Also, with respect to this point, the probe microscope can provide easy observation having high contrast.

On the other hand,, there is a foreign-matter inspecting apparatus utilizing laser light as an apparatus for detecting the position of microscopic sub-micron foreign-matter from a broad wafer surface. Further, as means for providing positional information of foreign-matter of a wafer surface obtained by a foreign-matter inspecting apparatus to stage coordinates of a probe microscope side, there is a method wherein a computer is used to link the foreign-matter inspecting apparatus with stage coordinates of a probe microscope, and thereafter a laser light is applied to a sample surface on which foreign-matter or defect would exist, and the scattered light generated by the foreign-matter or defect is detected by an optical microscope system in which a CCD camera is built in, thereby performing a positional correction (Japanese Patent Unexamined Publication No. H08-29354).

In a method of performing a positional correction by means of confirming, using an optical microscope system in which a CCD camera is built in, an image scattered by the fact that a laser light is applied to a sample surface and the laser light hits the foreign-matter, there is no detection problem where no pattern is formed on a wafer used as the sample surface, because only the foreign-matter causes scattering to the beam light. However, if there is formed a pattern, scattering occurs in the pattern, so that it becomes difficult to distinguish the foreign-matter from the scattered light.

Therefore, it is an object of the present invention to provide a probe microscope having a construction provided with means, which makes it possible to easily detect the position of foreign-matter, comprising means for detecting scattered light due to the foreign-matter without attenuating it and limitlessly weakening only the scattered light due to a pattern, even if there is the pattern on a wafer, in the scattered light when a laser light is applied.

SUMMARY OF THE INVENTION

The present invention reduces a scatted light component due to a pattern by having a construction in which polarizing elements are incorporated in a side of the laser light applying system and a side of the optical microscope.

In the present invention, since a pattern on a wafer, which is one constituted by adopting the above means, is formed in a constant direction, a scattered state becomes constant with respect to a laser light having a constant polarization and the laser light is scattered with its scattering direction becoming constant as well. Accordingly, it is possible to reduce the scattered light due to the pattern by incorporating a polarizing element whose scattering direction is different from the scattered light due to the pattern in a side of the optical microscope, which is a side at which a scattered image is observed. On the other hand, foreign-matter has no particular directionality, so that the scattered light due to the foreign-matter has a smaller polarization component. Consequently, the scattered light due to the foreign-matter is not greatly influenced by the polarizing element provided on the optical microscope side. By this, it is possible to easily confirm only a scattered image due to the foreign-matter. By this, it becomes possible to confirm a position of the foreign-matter on a sub-micron level even on the wafer on which the pattern has been formed, so that it becomes possible to perform an observation with a probe microscope.

DETAILED DESCRIPTION OF THE PREFERRED EMBODIMENTS

Figure 1:
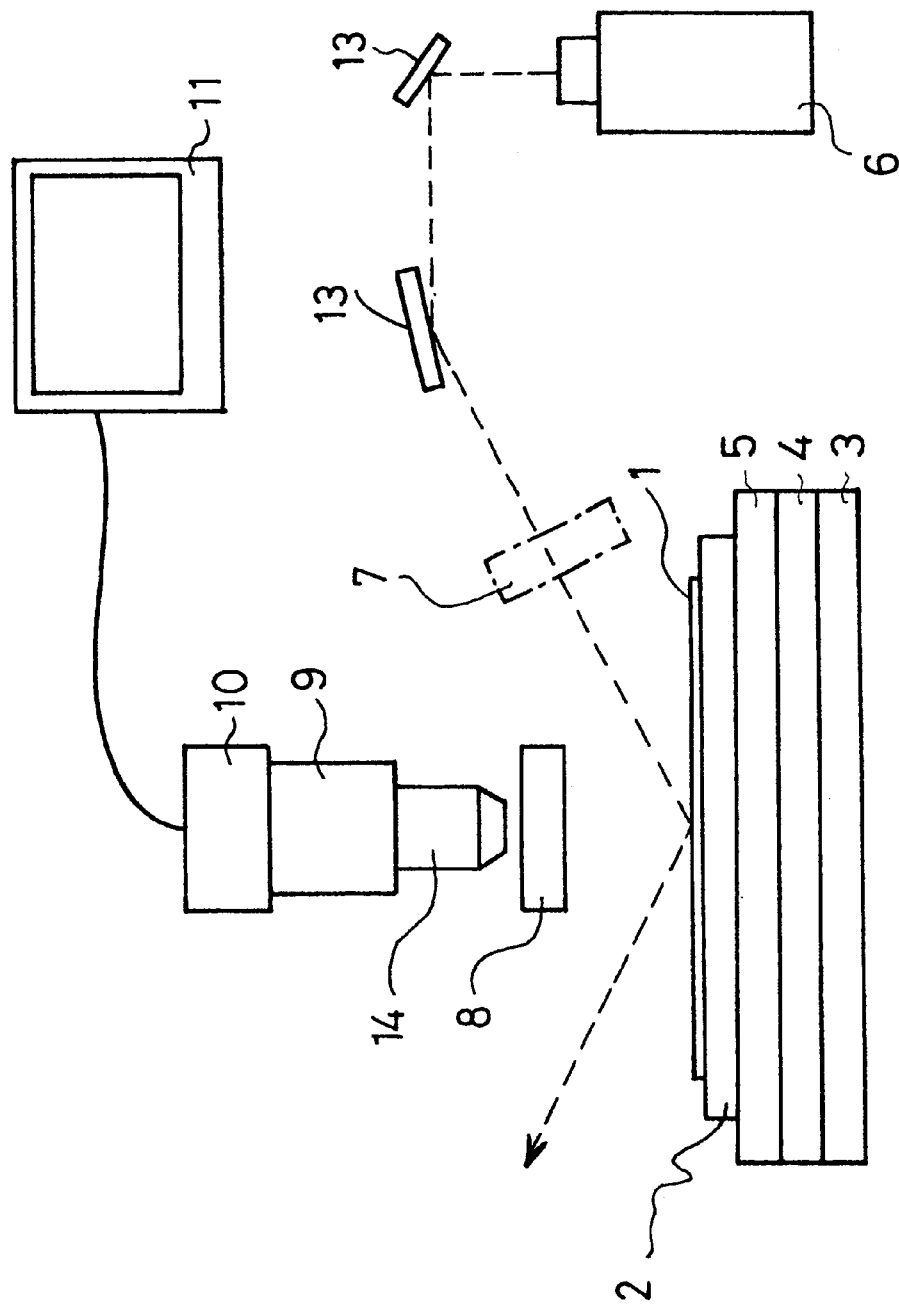
FIG. 1 is a view showing a conceptual diagram of the present invention.

The present invention is concerned with a probe microscope for observing a sample surface geometry and state, comprising a structure having a rough movement mechanism for rough positioning and a fine movement mechanism for fine positioning which cause relative movement between a sample and a mechanism for detecting physical characteristics such as interatomic force received from the sample, a control means for maintaining a distance between the sample and the mechanism for detecting a physical characteristic such as interatomic force constant, an anti-vibration mechanism for reducing transmission of vibration which comes from an installation environment to the apparatus, a control section for controlling an overall apparatus, and a computer, and having a beam light applying system for applying a beam light to a sample surface and an optical microscope system for observing the sample surface and thus having a function capable of confirming by the optical microscope system a position of foreign-matter existing on the sample surface due to the fact that the applied beam light is scattered by the foreign-matter, wherein a construction capable of incorporating a polarizing element is provided in a side of the beam light applying system or a side of the optical microscope.

In the probe microscope for observing a sample surface geometry and state having a function of confirming by the optical microscope system a position of the foreign-matter due to the fact that the applied beam light is scattered by the foreign-matter, it may have a construction capable of incorporating a polarizing element provided only in the optical microscope.

Further, it is desirable for the polarizing element incorporated in the optical microscope to be provided in a direction of a polarizing light nearly perpendicular to a polarizing light of the applied beam light (in a direction of S or P where the applied beam light is P or S polarizing light).

For example, the polarizing element incorporated in the beam light applying system or the optical microscope is provided in a direction of a polarizing light mutually, nearly perpendicular to a polarizing light of the beam light (S or P where the applied beam light is P or S polarizing light). Further, the polarizing elements incorporated in the beam light applying system and the optical microscope are provided in a direction of a polarizing light nearly perpendicular to each other.

Further, the polarizing element is provided immediately in front of an objective lens in the optical microscope system and behind the beam application device in the beam light applying system.

Further the polarizing element is provided behind an objective lens in the optical microscope system and behind the beam application in the beam light applying system.

Further, an image obtained by the optical microscope in the optical microscope system can be observed by a CCD camera and a highly sensitive CCD camera capable of observing even with low luminosity.

Further, in the polarizing elements incorporated in the beam light applying system and the optical microscope, at least one or both is/are provided with a mechanism having a construction capable of being inserted in or withdrawn from a beam light path or an optical microscope optical path.

Further, it is preferable to provide means for conducting a beam light coming from a beam oscillator to the beam light applying system by using an optical fiber.

Further, there is provided means for conducting a beam light coming from an optical part such as a mirror.

Further, it is preferable to have a structure in which a beam light of the beam light applying system can come in with an incident angle of 30° or less with respect to the sample surface.

Hereinafter, there will be explained an embodiment on the basis of the attached drawings.

Figure 2:
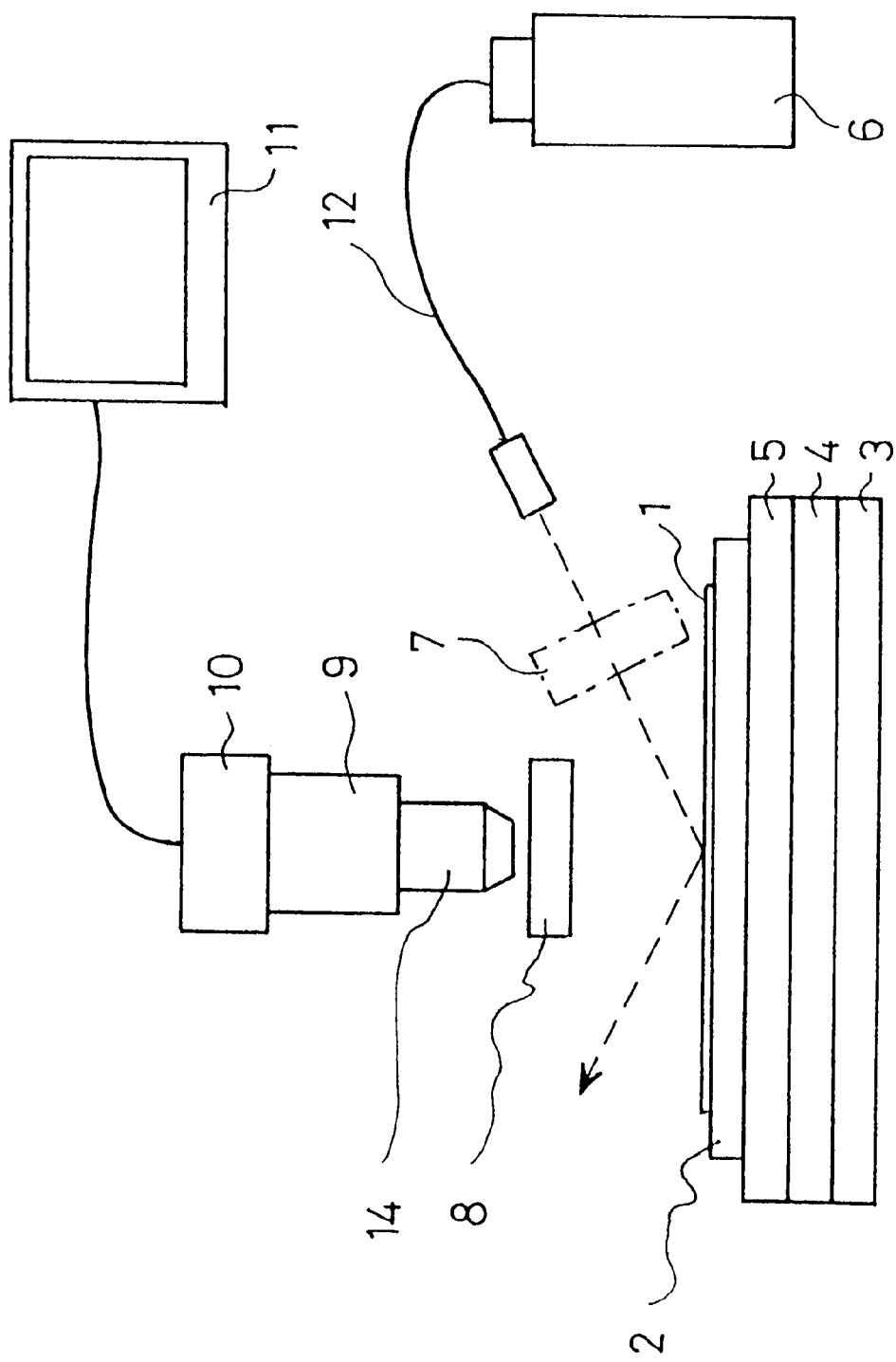
FIG. 2 is a view showing a conceptual diagram of the present invention.

FIG. 1 and FIG. 2 show conceptual diagrams of the present invention. It is adapted in such a manner that a sample 1 is mounted on three-dimensional motion stages 3, 4, 5 through a sample holder 2 and a laser light emitted from a laser oscillator 6 is applied through a polarizing element 7 or directly to a sample 1 surface, and it is arranged so that a scattered light scattered by foreign-matter on the sample 1 surface displayed on a monitor 11 through a CCD camera 10 mounted on an optical microscope 9, through a polarizing element 8 arranged in a direction perpendicular to a polarizing direction of the laser light applied to the sample. As a method of bringing a beam light to apply to the sample 1 surface, there are a method of using an optical fiber 12 and a method of suing optical parts such as a mirror 13.

Further, as to an optical microscope 9 having an objective lens 14 of high magnification, in the event that a sufficient distance is not obtained between the sample 1 surface and the objective lens 14, the polarizing element 8 is arranged behind the objective lens 14 for the sake of convenience.

Figure 3:
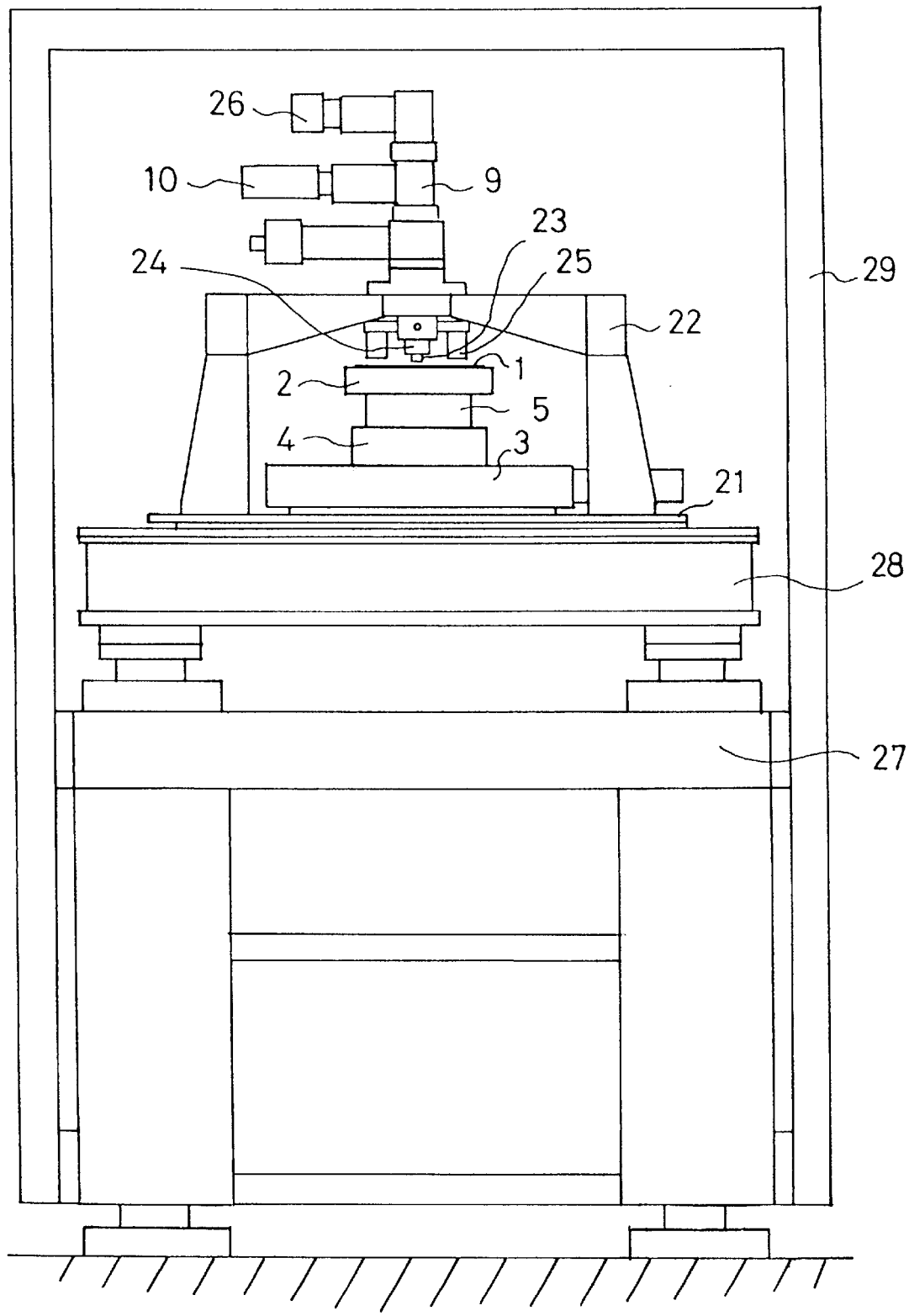
FIG. 3 is a view showing the construction of a probe microscope having a construction according to of the present invention.

FIG. 3 is a view showing the construction of a probe microscope unit section on which there is mounted the above described conceptual constitution, wherein parts such as the detecting section of the probe microscope are arranged on a table surface 21. On the table surface 21, there are fixed, as three-dimensional motion stages, an X-axis stage 3 for motion in a left-and-right direction in the drawings, i.e., in an X-axis direction, a Y-axis stage 4 for motion in a back-and-forth direction in the drawings, i.e., in a Y-axis direction, a Z-axis stage 5 for motion in a up-and-down/back-and-forth direction in the drawings, i.e., in a Z-axis direction, and a support arm 22. The sample 1 is fixed on the Z stage 5 through the sample holder 2. In case of a wafer, the sample is fixed by vacuum suction. At a position facing the sample 1, there is detecting section 23 for detecting a surface state of the sample 1 and it is fixed on a fine movement mechanism 24. The fine movement mechanism 24 is constituted by a piezoelectric element which is deformed by applying voltage thereto and it causes the detecting section 23 to three-dimensionally move with respect to the sample 1 surface. In the present embodiment, as the detecting section 23 there is used one constituted so as to optically detect a displacement of an extremely small spring element which is deformed when it is subjected to a physical force such as interatomic force or magnetic force from the sample 1 surface. This is one obtained by miniaturizing a so-called optical lever system in which a laser light is applied to a spring element and a positional derivation of its reflected light is detected by an optical detecting element, thereby making it a displacement signal. The fine movement mechanism 24 is fixed to the support arm 22.

Further, an optical microscope 9 having several objective lenses 25 is arranged at a position in the Y-axis direction of the fine movement mechanism 24 and the objective lenses 25 are fixed on an electrically-driven revolver. This enables the optical microscope 9 to vary its magnification. The optical microscope 9 projects an image on a monitor 11 through a highly sensitive CCD camera 10 or a CCD camera 26. The two CCD cameras are adapted so as to be separately used for the intensity of light of an object to be observed. The positional deviation amount, due to the mechanical constitution (arrangement) between a sample position viewed by the optical microscope 9 and the detecting section 23, is calculated by previously measuring with the same standard sample and registering it in a system. This makes it possible for the detection section 23 to detect at the same position as a position viewed by the optical microscope 9 using the three-dimensional stages 3, 4, 5. Incidentally, the basic concept of this method is described in Japanese Patent Unexamined Publication No. H3-40356.

And, the element parts stated before are all arranged directly or through an elastic member such as rubber on a surface table 28 of an anti-vibration mechanism 27. The elastic member has a function of not transmitting a vibrational component of a high frequency to the probe microscope section. Further, the element components are covered in structure by a sound-proofing cover 29. The sound-proofing cover 29 has, during observation by the probe microscope, functions of reducing the noise due to external sound and darkening a surrounding of the optical microscope to facilitate confirmation of the scatted light.

In this embodiment there were used an argon laser light corresponding to a wavelength of 488 nm and a green laser light corresponding to 540 nm. And, the laser light was applied to a sample 1 surface by the type using the mirror parts and the type using the optical fiber. It was applied under a state that the application angle is 45°±45° in an in-plane direction with respect to a pattern line formed on the sample 1 surface. Further, the arrangement was made to allow an incident angle of about 40°–5° with respect to the sample 1 surface.

Further, the polarizing element 8 was constitutionally placed in front of the objective lens 25, and a laser light was applied to the sample 1 surface through the polarizing element 7. The polarizing elements 7, 8 were constituted in such a manner that their insertion and withdrawal could be externally controlled by using a pneumatic cylinder or a drive mechanism of electromagnetic solenoid type.

Further, as to the optical microscope 9 whose objective lens 25 has a high magnification, the polarizing element 8 was arranged behind the objective lens 25 for convenience because a sufficient distance could not otherwise be obtained between the sample 1 surface and the objective lens 25.

By the structure mentioned above, a pattern formed in a constant direction on a wafer causes a laser light to scatter in a constant polarizing direction. Accordingly, the scattered light is varied by a polarizing element, and in a certain direction it becomes minimum and almost disappears. On the contrary, the scattered light due to foreign-matter having no directionality is difficult to be influenced by a direction of the polarizing element and, therefore, the scattered light does not disappear. For this reason, it becomes possible to distinguish the foreign-matter even against the pattern formed on the sample. By this, it becomes easy to specify the foreign-matter existing on the pattern. And, by using a probe microscope incorporated with an optical microscope, a probe microscope observation having a high sensitivity becomes possible easily.

What is claimed is:

1. A probe microscope for observing a sample surface geometry and state, comprising: detecting means for detecting a physical characteristic of a sample under observation; a positioning mechanism having a rough movement mechanism for causing a detecting element of the detecting means to undergo rough relative movement with respect to the sample and a fine movement mechanism for causing the detecting element to undergo fine relative movement with respect to the sample; control means for maintaining a distance between the sample and the detecting element constant; anti-vibration means for attenuating external vibration; a beam light applying system for applying a beam of light to the sample surface; an optical microscope for observing the sample surface so that the existence and location of foreign matter on the sample surface may be observed by observing the scattering of the applied beam light by the foreign matter; and a polarizing element incorporated into at least one of the beam light applying system and the optical microscope for polarizing light in such a manner that light scattered by a regular pattern on the sample is reduced by the polarization and light scattered by foreign matter on the sample is not reduced by the polarization.

2. A probe microscope according to claim 1; wherein the polarizing element is incorporated in the optical microscope so that the optical microscope may be used to determine the existence and location of foreign matter on the sample by observing scattering of the applied beam light by the foreign matter.

3. A probe microscope according to claim 1; wherein the polarizing element is incorporated in the optical microscope and has a direction of polarization that is nearly perpendicular to a polarizing light of the applied beam light so that when the applied beam light is P or S polarizing light the direction of polarization of the polarizing element is S or P, respectively.

4. A probe microscope according to claim 1; wherein the polarizing element incorporated in at least one of the beam light applying system and the optical microscope has a direction of polarization nearly perpendicular to a polarizing light of the beam light so that when the applied beam light is S or P polarizing light the direction of polarization of the polarizing element is P or S, respectively.

5. A probe microscope according to claim 1; wherein a polarizing element is incorporated in the beam light applying system and the optical microscope, and each polarizing element has a polarization direction nearly perpendicular to the other.

6. A probe microscope according to claim 1; wherein a first polarizing element is provided in front of an objective lens of the optical microscope so that the first polarizing element is disposed between the optical microscope and an observed sample and a second polarizing element is provided outside a path of the beam of light and in a path of light reflected from the sample in response to the beam of light.

7. A probe microscope according to claim 1; wherein a first polarizing element is provided behind an objective lens of the optical microscope so that the first polarizing element is not disposed between the sample and the objective lens and a second polarizing element is provided outside a path of the beam of light and in a path of light reflected from the sample in response to application of the beam of light.

8. A probe microscope according to claim 1; further comprising a plurality for cameras, including a highly sensitive CCD camera capable of observing the sample in a low luminosity, so that an image obtained by the optical microscope can be obtained with varying magnitude.

9. A probe microscope according to claim 1; wherein a polarizing element is incorporated in each of the beam light applying system and the optical microscope, and at least one of the polarizing elements is provided with a moving mechanism for moving the polarizing element so that the polarizing element may be selectively out of a path of light that is polarized by the polarizing element.

10. A probe microscope according to claim 1; wherein the beam light applying system comprises a beam oscillator and light transmitting means for transmitting a beam light emitted by the beam oscillator to the sample surface using an optical fiber.

11. A probe microscope according to claim 1; wherein the beam light applying system comprises a beam oscillator and light transmitting means for transmitting a beam light emitted by the beam oscillator to the sample surface using a mirror.

12. A probe microscope according to claim 1; further comprising means for varying an angle of incidence of a beam light of the beam light applying system so that the beam light can be projected onto the sample surface at an incident angle of 30° or less with respect to the sample surface.

13. A probe microscope according to claim 1; wherein the detecting means includes means for detecting a physical characteristic of the sample by monitoring an effect on the detecting element caused by the sample surface.

14. A probe microscope according to claim 1; wherein the detecting element comprises a probe having a sharpened tip, and a spring element formed integral with the probe, so that an interatomic force acting between the sample surface and the sharpened tip causes displacement of the spring element.

15. A probe microscope according to claim 14; wherein the probe is formed of an optical fiber.

16. A probe microscope according to claim 1; wherein the optical microscope comprises a plurality of objective lenses disposed on a revolver, and the detecting means and detecting element are also disposed on the revolver.

17. A probe microscope according to claim 1; wherein the rough movement mechanism comprises a sample stage movable along at least two axes, and the fine movement mechanism comprises an electrically-controlled piezoelectric element mounted to the detecting element to control the distance between the detecting element and the sample surface.

* * * * *